United States Patent
Startchik

(10) Patent No.: US 10,855,889 B2
(45) Date of Patent: Dec. 1, 2020

(54) IMAGING DEVICE FOR CAPTURING IMAGES OF MOVING OBJECTS

(71) Applicant: Anteleon Imaging Sarl, Geneva (CH)

(72) Inventor: Sergei Startchik, Geneva (CH)

(73) Assignee: Anteleon Imaging Sàrl, Geneva (CH)

(*) Notice: Subject to any disclaimer, the term of this patent is extended or adjusted under 35 U.S.C. 154(b) by 630 days.

(21) Appl. No.: 14/385,877

(22) PCT Filed: Mar. 28, 2013

(86) PCT No.: PCT/EP2013/056799
§ 371 (c)(1),
(2) Date: Sep. 17, 2014

(87) PCT Pub. No.: WO2013/144331
PCT Pub. Date: Oct. 3, 2013

(65) Prior Publication Data
US 2015/0062326 A1 Mar. 5, 2015

(30) Foreign Application Priority Data

Mar. 29, 2012 (EP) .................................... 12162068

(51) Int. Cl.
*H04N 5/225* (2006.01)
*G01N 21/84* (2006.01)
(Continued)

(52) U.S. Cl.
CPC .......... *H04N 5/2251* (2013.01); *G01N 21/84* (2013.01); *H04N 1/00827* (2013.01); *H04N 1/14* (2013.01);
(Continued)

(58) Field of Classification Search
None
See application file for complete search history.

(56) References Cited

U.S. PATENT DOCUMENTS

| 3,635,196 A | * | 1/1972 | Tsilibes .............. G03G 15/0801 |
| | | | 399/105 |
| 4,908,675 A | * | 3/1990 | Suzuki .................. G03G 15/01 |
| | | | 399/178 |

(Continued)

FOREIGN PATENT DOCUMENTS

| DE | 1120498 B | * 12/1961 | ............... H04N 1/14 |
| DE | 1120498 B | * 12/1961 | |
| GB | 2261341 A | 5/1993 | |

OTHER PUBLICATIONS

International Search Report PCT/ISA/210 for International Application No. PCT/EP2013/056799 Dated Apr. 23, 2013.

*Primary Examiner* — Kaitlin A Retallick

(74) *Attorney, Agent, or Firm* — Harness, Dickey & Pierce, P.L.C.

(57) ABSTRACT

There is described an imaging device for capturing images of at least portions of moving objects. The system comprises a stationary camera lens configured for reproducing an image of at least a portion of each moving object in an imaging plane when said object moves across a capturing region. The device further comprises at least one image sensor located in the imaging plane for receiving the reproduced image of the at least a portion of the corresponding moving object and converting said image into electronic signals. The at least one image sensor is mounted on a sensor support adapted to be actuated in a manner that the at least one image sensor is moved in the imaging plane relative to the stationary camera lens, and in a manner that the motion of said at least one image sensor is synchronized with the motion of the moving object to be captured. This ensures that there is substantially no relative movement between the reproduced image in the imaging plane and the image sensor when said moving object moves across the capturing region. As a result motion blur of the captured image of the at least a portion of each moving object is prevented or significantly reduced.

16 Claims, 5 Drawing Sheets

(51) Int. Cl.
*H04N 1/14* (2006.01)
*H04N 1/195* (2006.01)
*H04N 1/00* (2006.01)
*H04N 5/232* (2006.01)
*H04N 7/18* (2006.01)

(52) U.S. Cl.
CPC ......... *H04N 1/195* (2013.01); *H04N 5/23229* (2013.01); *H04N 7/181* (2013.01); *H04N 7/183* (2013.01); *G01N 2021/845* (2013.01); *H04N 2201/0081* (2013.01); *H04N 2201/0442* (2013.01); *H04N 2201/0454* (2013.01)

(56) References Cited

U.S. PATENT DOCUMENTS

| | | | | |
|---|---|---|---|---|
| 5,256,883 | A * | 10/1993 | Weichmann | B41F 33/0036 250/559.07 |
| 5,687,010 | A * | 11/1997 | Van Tilborg | H04N 1/1017 358/496 |
| 5,750,985 | A * | 5/1998 | Suzuki | H04N 5/3692 250/226 |
| 6,907,103 | B2 | 6/2005 | Rosner et al. | |
| 2003/0194111 | A1* | 10/2003 | Kano | H04N 1/1013 382/112 |
| 2010/0141803 | A1* | 6/2010 | Jung | H04N 5/232 348/240.3 |

\* cited by examiner

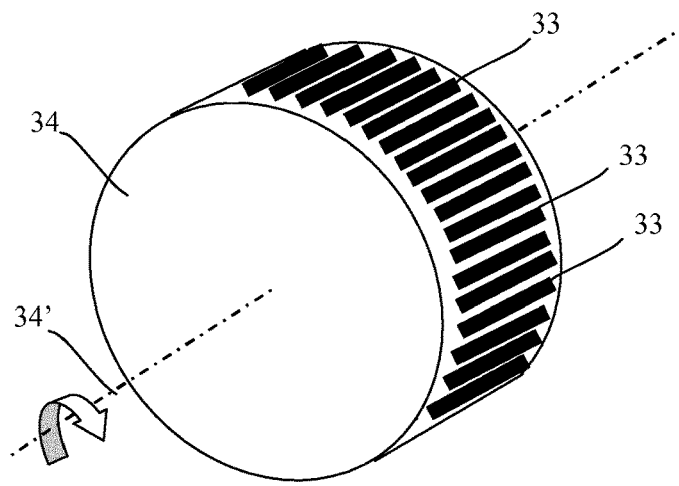
Fig. 4
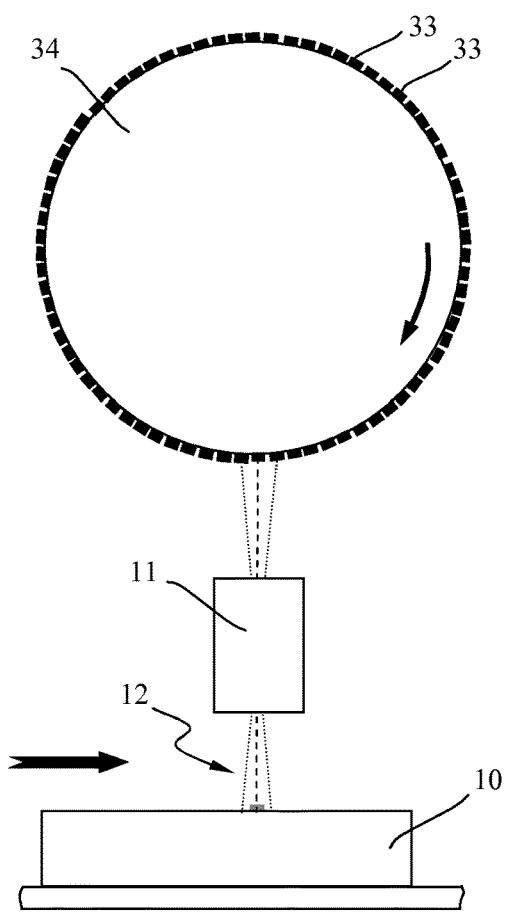 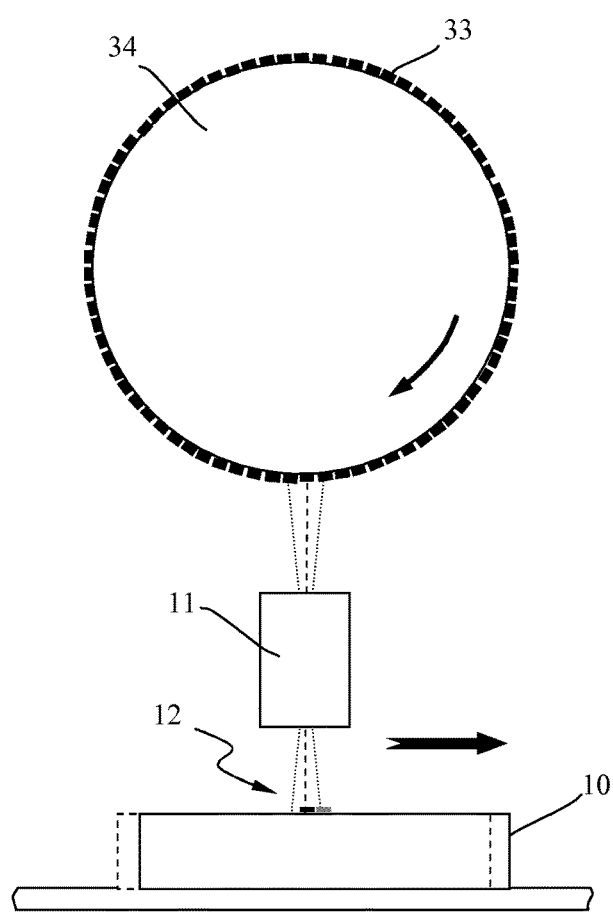
Fig. 4a　　　　　　　　Fig. 4b

IMAGING DEVICE FOR CAPTURING IMAGES OF MOVING OBJECTS

FIELD OF THE INVENTION

The present invention relates to an imaging device that is capable of capturing images of objects moving at high-speed. More specifically, the imaging device comprises at least one image sensor configured to move synchronically with the moving object in order to prevent or significantly reduce motion blur of captured images.

BACKGROUND ART

Industrial manufacturing processes usually comprise control steps, which may imply capturing and/or analysing images of the objects being manufactured.

In order to capture an image of an object on a manufacturing line with sufficient quality, an option is to temporarily immobilize the object at a precise location on the manufacturing line and to take a picture of the immobilized object, for example with a stationary camera. The object is then moved again along the manufacturing line. This allows achieving optimal image quality, since the captured objects are stationary while their image is being taken. A drawback of this option, however, is that immobilizing the objects being manufactured reduces the throughput of the manufacturing line, which can be critical in some applications. Furthermore, locally interrupting the flow of the products being processed on the manufacturing line is not always possible.

Another option is thus to capture images of the objects to be controlled while they move on the manufacturing line, which allows maintaining objects in motion at a constant velocity in order to maximize the throughput of the production line. The problem of capturing an image of an object in motion is to avoid motion blur that can reduce the image quality and make it insufficient for performing the controlling tasks.

U.S. Pat. No. 6,907,103 discloses an imaging system that is capable of capturing images of moving objects with minimal motion blur. This is achieved by moving a point source of illumination such that the position from which illumination is projected is changed as the object moves to ensure that the position of the image projected onto an imaging plane remains substantially effectively stationary. The position from which illumination is projected functions as a point source of illumination. An image sensor of the imaging system is positioned in the imaging plane and receives illumination projected from the position of the illumination source that passes through the moving object. The image sensor produces electrical signals in response to the received illumination. Because the image of the moving object remains effectively stationary on the image sensor, which is located in the imaging plane, an image of at least a portion of the moving object can be constructed with minimal blurring and without having to halt the object to capture an image of it.

The illumination source of this system is preferably x-rays that pass through the object. Because the projection angle of the illumination source varies somewhat between two given positions of the object, a slightly different view of the region of the object will be captured at each position. This could slightly impair the image quality.

High speed cameras integrating sensor with two-dimensional arrays of pixels in various resolution (e.g. 640 horizontal by 480 vertical, 1024×1024, 1600×1200, or any other appropriate resolution) can be used to capture images of moving objects. However, in order to achieve a sharp image of a moving object, array sensors need short exposure times, preferably controlled by shuttering synchronization equipment in order to synchronize the time of the exposure with the current position of the moving object, and/or powerful strobed illumination in order to increase the amount of light received by the sensor during exposure, all of which add to the system complexity and thus costs. Furthermore, large apertures are generally used in order to compensate for the short exposure time, thereby limiting the cameras' depth of field, which can limit their use in cases for example where several control points on the objects are not in a same plane relative to the camera's axis.

Line scan cameras using linear image sensors have been developed for capturing images of objects moving at high speed. Linear image sensors having a single line of pixels, the image data captured by the sensor can be read out much faster than what is achievable with any conventional array sensor. The time delay between two successive exposures of a linear sensor is thus significantly reduced compared to array image sensors. Linear sensors furthermore allow building continuous images that are not limited in their vertical resolution, thereby reducing or even avoiding the need of synchronizing the sensor's exposure timeframe with the moving objects' position. The maximum allowable speed of a moving object to be captured by a line scan camera is basically determined by the camera's maximum line rate, i.e. the maximal number of successive sensor exposures in a given time, and the linear distance of the object that is captured by the linear sensor at each exposure, which depends on the distance of the object to the camera, the camera's optics, etc. Some standard line scan cameras can achieve maximum line rates of almost 19 kHz, which allows them efficiently capturing objects moving at a maximal speed in the range of 2 m/s in typical production line configurations.

Linear sensors however still need a given amount of light exposure in order to produce usable image data. Increasing a line scan camera's line rate thus requires an increased lighting of the moving objects. High speed line scan cameras thus still require powerful and/or sophisticated lighting solutions.

Another drawback of line scan cameras is that they have a minimal line rate, so that the moving objects need to travel at a minimal speed in front of the camera in order to avoid capturing twice the image of a same part of the object.

In an attempt to decrease the lighting requirement of high speed line scan cameras, so called high sensitivity linear sensors using Time Delay and Integration (TDI) technology have been developed, in which a linear image of the moving object is produced by integrating its image captured over a number of rows of pixels. This technology however does not allow increasing the moving object's speed. Another drawback of such high sensitivity line scan cameras is that the object's moving direction needs to be perfectly perpendicular to the pixel rows. Furthermore, such sensors are very sensitive to light or object's speed variations.

Accordingly, an aim of the present invention is to provide an imaging device for capturing sharp images of objects moving at very high speed.

Another aim of the present invention is to provide a high speed camera that allows capturing fast moving objects with a longer depth of field.

Still another aim of the invention is to provide an imaging device for capturing sharp images of moving objects with minimal lighting requirements.

SUMMARY OF THE INVENTION

These aims and other advantages are achieved by an imaging device for capturing images of at least portions of moving objects as set out in independent claim 1.

These aims and other advantages are achieved in particular by an imaging device for capturing images of at least portions of moving objects, the device comprising a stationary camera lens for reproducing an image of at least a portion of a moving object in an imaging plane when the object moves across a capturing region, and at least one image sensor located in the imaging plane for receiving the reproduced image of the portion of the moving object and converting said image into electronic signals, wherein the image sensor is mounted on a sensor support adapted to be actuated in a manner that the image sensor is moved in the imaging plane relative to the stationary camera lens, and in a manner that the motion of the image sensor is synchronized with the motion of the moving object while it moves across the capturing region, such that there is substantially no relative movement between the reproduced image in the imaging plane and the image sensor when the moving object moves across the capturing region.

Moving the sensor in the imaging plane such that there is substantially no relative movement between the image to be captured as reproduced in the imaging plane and the image sensor, allows avoiding motion blur of the captured image whatever the image sensor's exposure time is. This therefore allows achieving sharp images of fast moving objects with reduced lighting and/or apertures. The moving object maximal speed is limited only by the size of the imaging plane and/or the maximal speed of the image sensor within said imaging plane.

In addition, the imaging device according to a preferred embodiment of the invention further comprises conveyor means in the form for example of a conveyor belt adapted to move said moving objects relative to the ground or for example to a supporting structure along a given path to bring each moving object across the capturing region. In this configuration, the camera lens is mounted stationary relative to the ground or to the supporting structure. The imaging device according to this embodiment is well-suited for control quality in a production or for authenticating products where visual characteristics are used for verification.

The at least one image sensor of the imaging device of the invention can be an area array image sensor or a linear image sensor.

The sensor support is preferably actuable such that the at least one image sensor and the moving object move in opposite directions along substantially parallel rectilinear trajectories when the object moves across the capturing region.

In embodiments, the sensor support is a belt along which a plurality of image sensors are mounted, the belt being linearly actuable in order to impart a linear movement to each image sensor when passing above the camera lens while a moving object to be captured moves across the capturing region.

In other embodiments, the sensor support is a cylindrical support rotatable about its longitudinal axis, with said longitudinal axis being essentially perpendicular to the axis of the camera lens, and the at least one image sensor is mounted on the circumference of the cylindrical support such that it is moved in the imaging plane relative to the stationary camera lens by rotating the cylindrical support.

In embodiments, the imaging device comprises a plurality of linear image sensors mounted on the sensor support, whereas the plurality of linear image sensors is configured so that at least some of them capture each a part of the reproduced image when the moving object moves across the capturing region, wherein the imaging device is configured for reconstituting the image of at least a portion of the moving object from said parts of the reproduced image taken by each of the at least some linear image sensors.

In embodiments, the imaging device comprises at least one cluster of image sensors, each cluster comprising a plurality of linear image sensors mounted on the sensor support, whereas the plurality of linear image sensors is configured so that each linear image sensor captures a part of the reproduced image when the moving object moves across the capturing region, wherein the imaging device is configured for reconstituting the image of at least a portion of the moving object from the parts of the reproduced image taken by each linear image sensor of the corresponding cluster.

In embodiments, the sensor support is a cylindrical support rotatable about its longitudinal axis, which is essentially perpendicular to the axis of the camera lens, and the imaging device comprises a plurality of clusters comprising each a plurality of linear image sensors mounted on the circumference of the cylindrical support along disconnected arc of circles, wherein the imaging device is configured for reconstituting the image of at least a portion of the moving object from parts of the reproduced image taken by each linear image sensor of the corresponding cluster while said cylindrical support rotated about an angle corresponding to an arc of circle.

In embodiments, the sensor support is rotatably actuable to move the at least one image sensor in the imaging plane of the camera lens as the corresponding moving object moves across the capturing region. The rotatable sensor support is then for example configured to be further actuated along a linear direction opposite to the direction of the moving object when the object moves across the capturing region. The rotatable sensor support may comprise one image sensor, wherein the rotatable support is adapted to rotate approximately through 360° between two captured images of two successive moving objects. The rotatable sensor support may also comprise N image sensors and be adapted to rotate through 360°/N between two captured images of two successive moving objects. The N image sensors are for example mounted at different heights on the rotatable sensor support in order to capture images at different focal lengths of the camera lens.

The imaging device of the invention preferably comprises a processing unit that process data relating to the position, the velocity and the distance of each moving object from the capturing region in order to adapt the speed of the sensor support to ensure that each moving object is placed in correspondence with an image sensor when the moving object moves across the capturing region.

The imaging device of the invention preferably comprises a processing unit that controls the rotation speed of the rotatable sensor support in a manner to accelerate or decelerate its rotation speed upon an external signal indicating an approaching moving object to the capturing region in order to position the corresponding image sensor above the camera lens when the moving object moves across the capturing region.

The imaging device of the invention preferably comprises means for retrieving images from the at least one image sensor by radio waves and optionally for providing power supply to the at least one image sensor.

BRIEF DESCRIPTION OF FIGURES

The invention will be better understood thanks to the following detailed description of embodiments with reference to the attached drawings, in which:

FIG. 4 shows a schematic view of a rotatable sensor support of the imaging device according to another embodiment of the invention;

FIG. 4a and FIG. 4b show a schematic front view of the imaging device comprising the sensor support of FIG. 4 while capturing an image of a first, respectively a second adjacent linear part of a moving object;

DETAILED DESCRIPTION OF THE INVENTION

Figure 1:
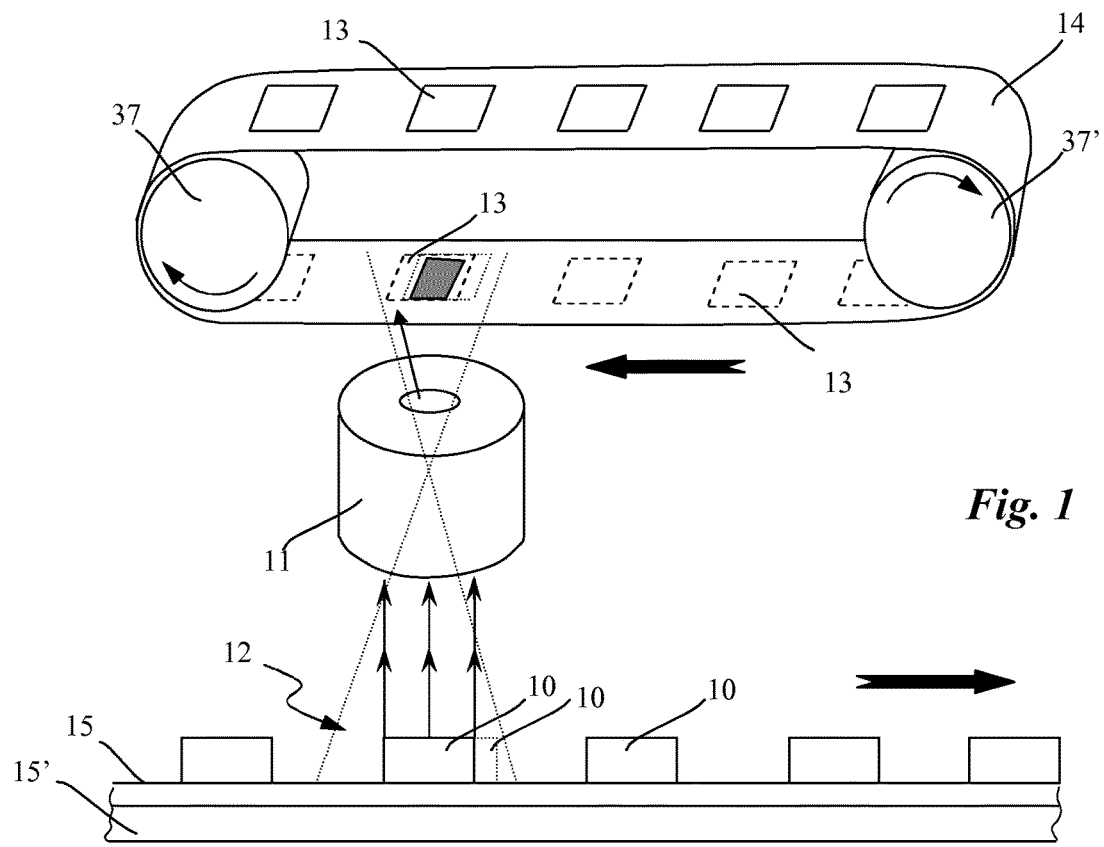
FIG. 1 shows a schematic view of the imaging device according to an embodiment of the invention.

According to an embodiment of the invention illustrated in FIG. 1, the imaging device is provided with image sensors 13 for capturing the image of moving objects 10 reproduced by a camera lens 11 in the imaging plane, and for converting said reproduced image into electronic signals. The term "camera lens" as used in the present description encompasses any optical device comprising an optical lens or an assembly of lenses and adapted for reproducing in an imaging plane behind it, an image of an object located in front of it. The objects 10 are moved for example by a conveyor belt 15 or by any other conveyor or transport means. The conveyor belt 15 is for example adapted to move relative to a supporting structure 15', while the camera lens 11 is stationary relative to said supporting structure 15'. Each moving object 10 is brought in turn by the conveyor belt 15 across a capturing region 12. The capturing region corresponds for example to the area that is covered by a moving object 10 during the exposure time defined for the capturing of the image (i.e. exposure time of the photography).

In the embodiment illustrated in FIG. 1, the imaging device includes a sensor support in the form of a belt 14 looped for example over two pulleys 37, 37' that are diametrically opposed.

Rotation of pulleys 37, 37' moves said belt 14 such that it imparts to each image sensor 13 in the imaging plane a linear movement relative to the camera lens 11, in a direction opposite to the direction of the linear movement of the corresponding moving object 10 in the capturing region 12. The speed of the image sensor 13 in the imaging plane is synchronized with the motion of the moving object 10 to be captured, such that there is substantially no relative movement between the reproduced image in the imaging plane of the corresponding moving object 10 and the image sensor 13 when said corresponding moving object 10 moves across the capturing region 12. Other driving means known from the one skilled in the art and adapted to impart a linear movement to belt 14 could be contemplated within the frame of the invention.

According to the illustrated embodiment, several image sensors 13 with two-dimensional arrays of pixels in any appropriate resolution, for example 1024×1024 pixels, are disposed along the outer surface of belt 14. The image sensors 13 are for example regularly spaced along the entire belt 14. The spacing between the image sensors 13 is for example dimensioned according to the spacing between two moving objects 10 on the conveyor belt 15, so that at least one mage sensor 13 is located in the imaging plane each time a moving object 10 is in the capture region 12.

Figure 2:
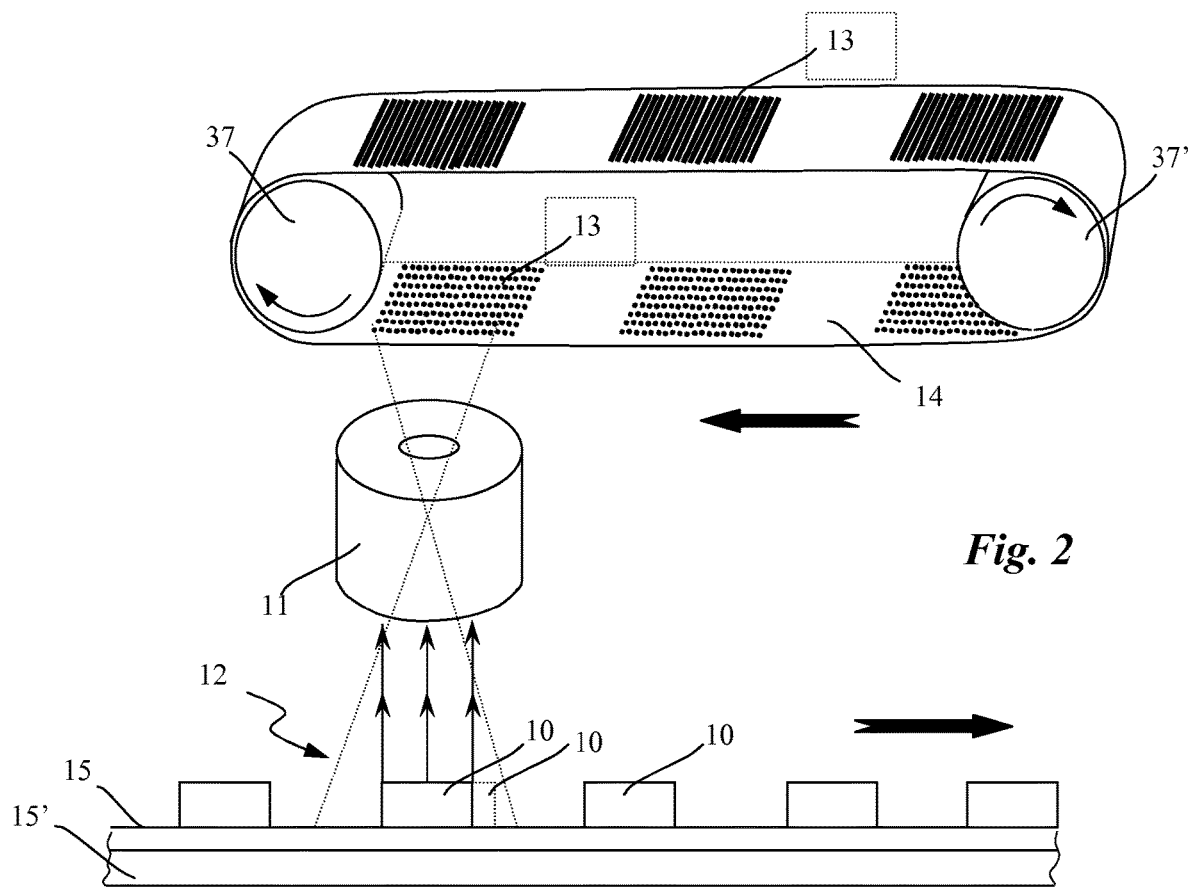
FIG. 2 shows a schematic view of the imaging device according to another embodiment of the invention.

According to a variant embodiment of the invention illustrated in FIG. 2, the imaging device comprises a plurality of linear image sensors 13 mounted on a belt 14. Linear image sensors 13 comprise a single row of active pixel, such as for example the CCD 134 image sensor commercialized by Fairchild Imaging, Inc. In the illustrated example, the linear image sensors are grouped into several clusters comprising each N linear image sensors 13, whereas N is for example determined in accordance with the desired definition of the image to be captured. The linear sensors 13 are preferably mounted on the sensor support 14 with their row of pixels oriented perpendicularly to the travelling direction of the sensor support 14 and of the conveyor 15.

The clusters are for example arranged along the belt 14 and spaced from each other by a step that may be determined according to the spacing between two adjacent objects 10 moving on the conveyor belt 15. Each cluster is for example configured to take N successive or simultaneous images of adjacent parts of a moving object 10. The entire image of the corresponding moving object 10 or portion of interest thereof is then reconstituted from the N images taken by each of the linear image sensors of the corresponding cluster. The number N of linear image sensors is for example 1024, while each linear sensor comprises 1024 pixels, thus resulting in an image of a maximum configuration of 1024×1024.

In a configuration where the linear sensors 13 of each cluster are activated successively and not simultaneously, each linear image sensor is preferably activated shortly before travelling over the center of the camera lens 11, where distortions are minimized, until shortly after. By activating each linear sensor for example from half of the exposure time before it is aligned with the camera lens's axis until half of the exposure time after it was aligned with the camera lens's axis, the exposure time of each linear sensor can be made approximately as long as its travelling time through the imaging plane of the camera lens 11. This maximal exposure time is thus significantly longer than the maximal exposure time similarly achievable with array image sensors, since array image sensors travelling at the same speed would stay a much shorter time entirely within the imaging plane. This thus allows reducing the lighting of the objects 10 and/or reducing the aperture of the camera lens 11 in order to obtain a greater depth-of field. This advantage can also be used for maximizing the travelling speed of the linear image sensors 13 in the imaging plane, which allows capturing images of faster moving objects 10.

Figure 3:
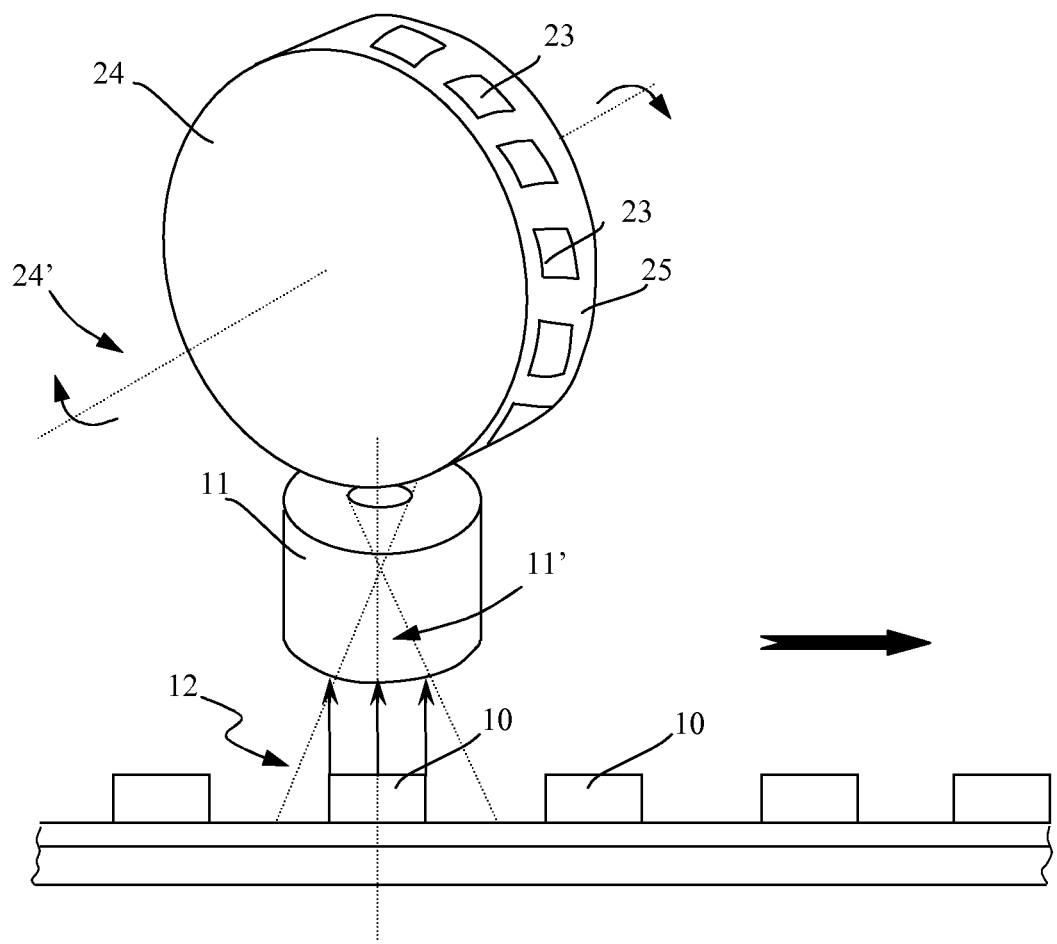
FIG. 3 shows a schematic view of the imaging device according to yet another embodiment of the invention.

According to another embodiment of the invention and with reference to FIG. 3, the imaging device comprises a rotatable cylindrical support 24 having a circular outer surface, or periphery, along which several image sensors 23 are positioned. This support 24 is mounted above the camera lens 11 and rotates around its longitudinal axis 24', which is oriented essentially perpendicular to the axis 11' of the camera lens 11 in order to bring each image sensor 23 in turn in the imaging plane of the camera lens 11 while a corresponding moving object 10 moves across the capturing region 12.

In a variant embodiment, each image sensor 23 is mounted on a holder (not shown) designed to compensate the curvature of the circular outer surface 25 of support 24 in order to make sure that each image sensor 23 is entirely positioned flat in the imaging plane while capturing the corresponding image.

In yet a variant embodiment illustrated in the FIGS. 4, 4a and 4b, the imaging device comprises a plurality of linear image sensors 33, for example M linear image sensor of 1'024 pixels each or of any other suitable definition, that are mounted adjacent to each other around the surface of a cylindrical sensor support 34. The cylinder 34 is mounted to rotate about an axis 34' perpendicular to the axis of the camera lens 11 in order to bring each linear image sensor 33 in turn in the imaging plane while the corresponding moving object 10 moves across the capturing region 12. A processing unit (not shown) is coupled with a motor (not shown) and processes data relating to the position, the velocity and the distance of the moving object 10 from the capturing region 12 in order to adapt the speed of rotation of the cylinder 34 such that each line scan sensor 33 is brought in correspondence with a specific part of the moving object 10 when it moves across said capturing region 12. In this configuration, the cylinder 34 is for example adapted to rotate through 360°/M between two captured images of two successive adjacent parts of the moving object 10. The image of the portion of interest of the moving object 10 is then reconstituted from N partial images taken each by a corresponding linear imaging sensor 33, whereas N is determined by the size and/or the definition of the desired image. The diameter of the cylinder 34 and the number of linear sensors 33 are parameters than can be adapted for example according to the size of the object to be monitored and the resolution sought.

Figure 5:
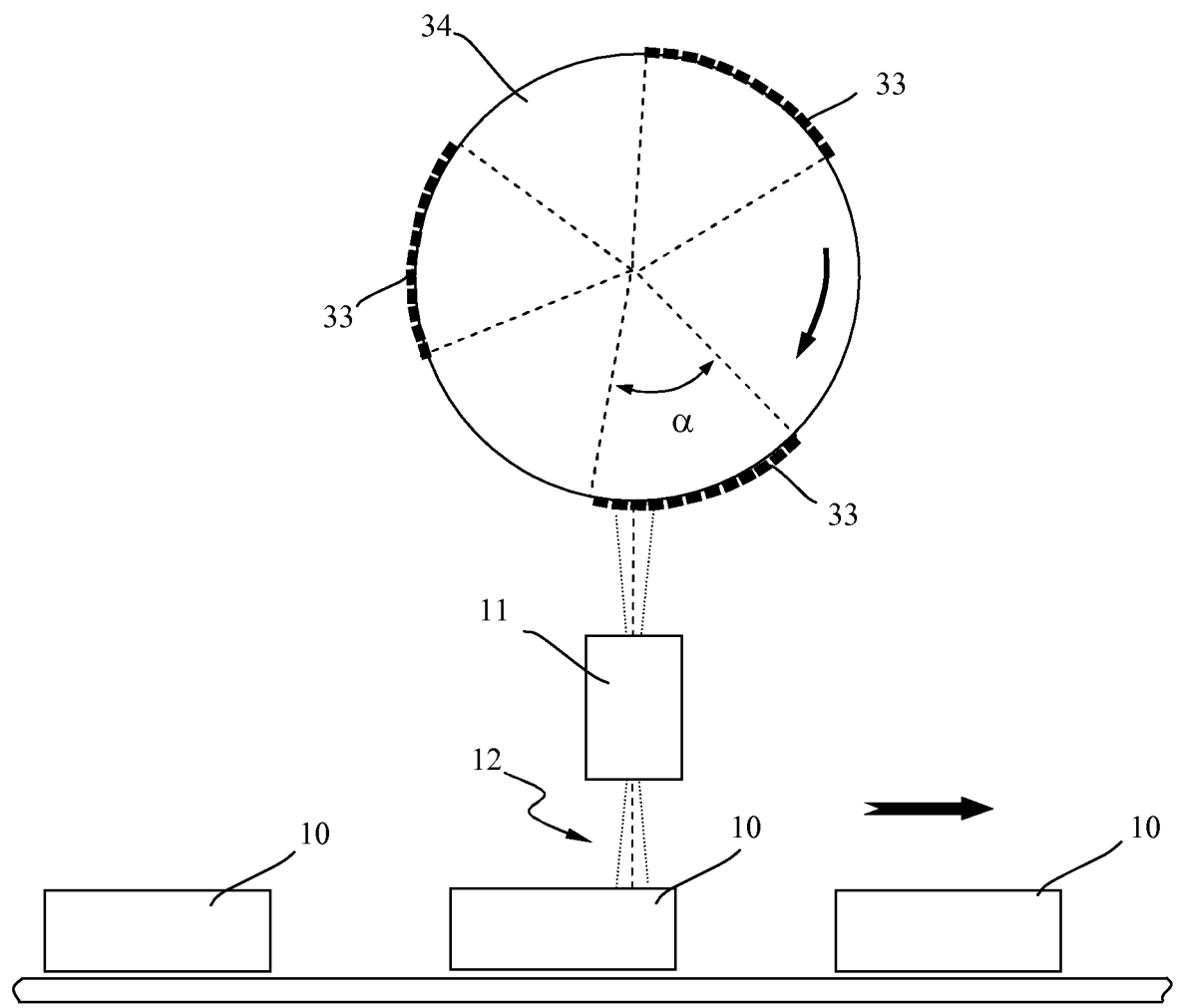
FIG. 5 shows a schematic view of the imaging device according to still another embodiment of the invention.

According to a variant embodiment of the invention illustrated in FIG. 5, the imaging device comprises several clusters of N linear sensors 33 mounted around the periphery of the cylinder 34 along disconnected arc of circles α. The N linear image sensors 33 of each cluster are configured to take N successive images of adjacent parts of a moving object 10 while the cylinder rotates about an angle corresponding to α. In this configuration, an entire image of the portion of interest of the moving object 10 is reconstituted from N partial successive images taken by the N linear image sensors 33 of a same cluster.

Figure 6:
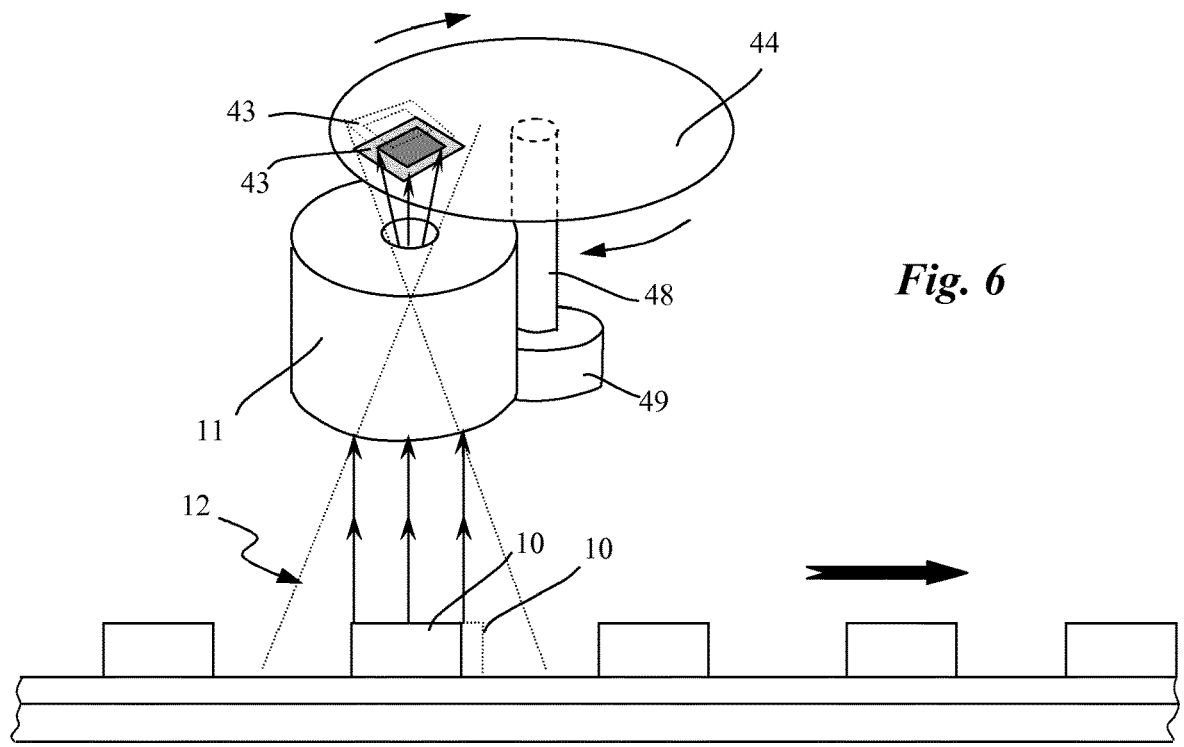
FIG. 6 shows a schematic view of the imaging device according to another embodiment of the invention.

In still another embodiment of the invention illustrated in FIG. 6, an image sensor 43, with a two-dimensional array of pixels, is for example mounted on a rotatable disc 44 that is brought into rotation in an imaging plane of camera lens 11 by a motor 49. The disc 44 is for example axially connected to motor 49 through a shaft 48. Rotation of disc 44 moves the image sensor 43 in said imaging plane in a direction substantially opposite to the direction of the moving object 10 to be captured when said object 10 moves across the capturing region 12.

A processing unit (not shown) is coupled with motor 49 and processes data relating to the position, the velocity and the distance of each moving object 10 from the capturing region 12 in order to adapt the speed of rotatable disc 44 in a way that image sensor 43 is brought in correspondence with each moving object 10 when it moves across said capturing region 12. In this configuration, the rotatable disc 44 rotates approximately through 360° between two captured images of two successive moving objects 10.

In other embodiments, the rotation speed of rotatable disc 44 is constant and determined on the basis of the time interval between two successive objects 10 crossing the capturing region 12. The rotation speed of disc 44 is for example set such that disc 44 rotates at constant speed through 360° during the time interval separating two successive objects 10 crossing the capturing region 12. Once the rotation speed of disc 44 is set, the distance of image sensor 43, in particular the distance of the centre of image sensor 43, to the rotation axis of disc 44 is determined such that the linear speed of sensor 43 while capturing the image of a moving object 10 reproduced by camera lens 11 matches the speed of said object 10 moving across the capturing region 12, in particular such that the linear speed of sensor 43 is substantially equal to the speed of the reproduced image in the imaging plane.

Rotation speed of disc 44 and distance of the centre of image sensor 43 from the rotation axis of disc 44 are thus controlled and/or determined to move image sensor 43 in the imaging plane relative to stationary camera lens 11 while the moving object 10 moves across the capturing region 12, in a manner that there is substantially no relative movement between the reproduced image of said moving object 10 in the imaging plane and image sensor 43 as shown in FIG. 6.

By moving image sensor 43 in this manner, motion blur of the captured images is prevented or at least significantly reduced without the need to halt the moving object and to allow the object to settle before capturing an image of it. Moving image sensor 43 in the imaging plane according to the invention also allows using relatively long exposure times given the speed of the moving object 10, which can reach one to several meters per second, which in turn allows using relatively small apertures, thus resulting in captured images having greater depth of field.

The object 10 moving for example along a rectilinear trajectory, and the diameter of rotatable disc 44 should be preferably large enough so that the movement of image sensor 43 located at the periphery of said disc 44 can be considered as being almost linear during the exposure time of the imaging system thereby improving the quality of the image as both the corresponding moving object 10 and image sensor 43 move in opposite directions along a same rectilinear axis.

In a variant, image sensor 43 is mounted for example on a piezoelectric device (not shown) mounted on disc 44, wherein the piezoelectric device is activated to rotate image sensor 43 in a direction opposite to the rotation of rotatable disc 44 while capturing the image of an object 10 moving across the capturing region 12 (i.e. during the exposure time of the imaging device) in a manner that both the image sensor 43 and the moving object 10 move linearly relative to each other thereby preventing distortion of the image. According to this variant, the size of disc 44 can be kept small without impacting on the quality of the image, thereby providing for a more compact imaging device. The smaller disc 44 is, the more important the rotation of image sensor 43 relative to disc 44 must be in order to compensate the non-linearity of the disc's movement in the imaging plane.

In another variant, the imaging device according to the invention can be developed to integrate driving means adapted to advantageously further actuate rotatable disc 44 along a linear direction in the imaging plane opposite to the direction of the moving object 10, when said object 10 moves across the capturing region 12.

In a further embodiment, the imaging device is adapted to impart linear and rotational movement to rotatable disc 44 in sequence order. More particularly, rotational and linear movements are dissociated in a manner that disc 44 is first rationally actuated to bring image sensor 43 near the area of the imaging plane where the image of moving object 10 is set to be reproduced, and then linearly actuated when said moving object 10 moves across the capturing region 12.

The imaging device preferably comprises guiding means (not shown) adapted to cooperate with the circumferential edge of disc 44 to prevent or reduce vibration which could significantly impair the quality of the reproduced image.

Figure 7:
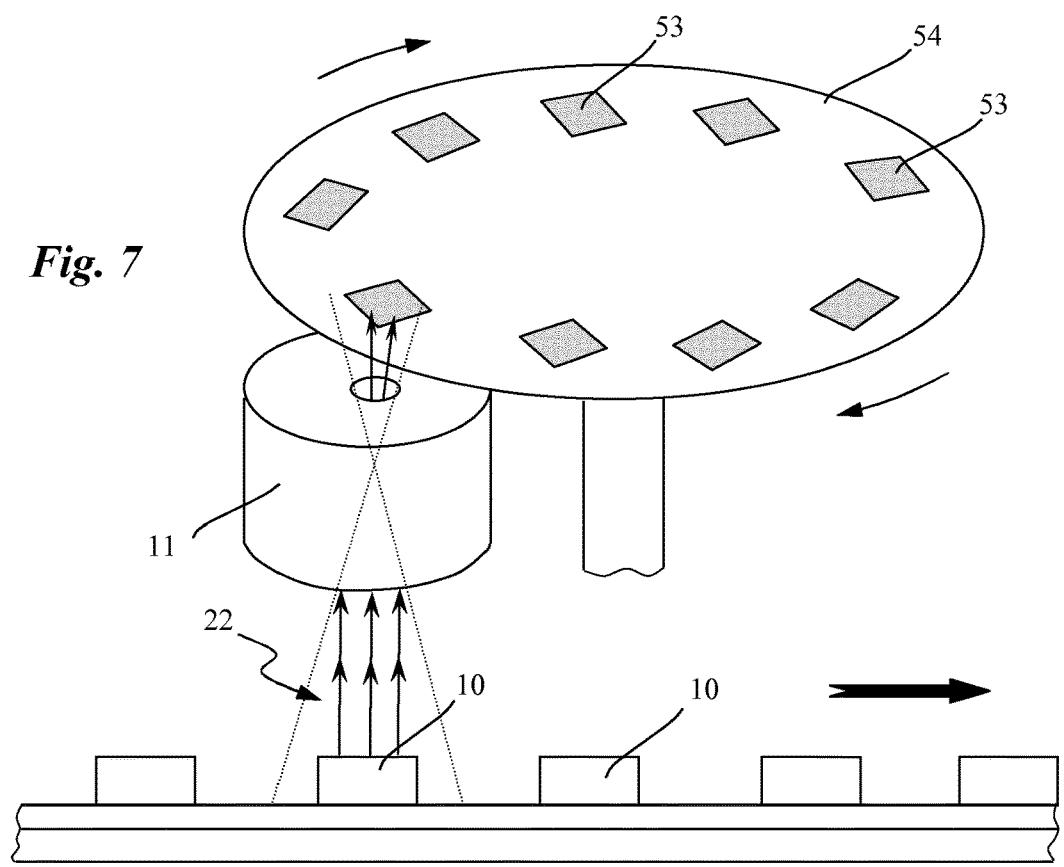
FIG. 7 shows a schematic view of the imaging device according to another embodiment of the invention.

According to another embodiment of the invention as illustrated by way of example in FIG. 7, the imaging device comprises a rotatable support 54 in the form of a disc that is adapted to hold N image sensors 53 (N being for example comprised between 2 and 12) regularly spread along a circle centred on the support's centre. Each image sensor 53 is arranged to move above the camera lens 11 while their respective moving object 10 are brought in turn by conveyor belt 25 across the capturing region 12. In this configuration, rotatable support 54 is adapted to rotate through 360°/N between two captured images of two successive moving objects 10.

The imaging device according to the invention also comprises means for retrieving images data from the moving image sensor(s) and/or for powering and controlling said sensors. These means may for example include electrical and/or optical contacts, such as for example slip rings, brush contacts, and/or any other appropriate contacts, possibly including wireless connections.

The imaging device according to any one of above-described embodiments of the invention preferably further comprises a processing unit that processes data relating to the position, the velocity and the distance of each moving object from the capturing region in order to adapt the speed of the sensor support to ensure that each moving object is placed in correspondence with the one image sensor or the corresponding image sensor when each moving object moves across the capturing region.

Alternately, the imaging device according to any one of these embodiments further comprises a processing unit that controls the rotation speed of the sensor support in a manner to accelerate or decelerate its speed upon reception of an external signal triggered when the moving object is about to move across the capturing region. Consequently, the corresponding image sensor is positioned above the camera lens when the moving object moves across said capturing region.

These could be achieved by conventional algorithms which can be considered as part of the general knowledge of the person skilled in the art and will therefore not be described therein.

According to the present invention, the sensor support may be of various configurations for linearly moving the image sensor(s) in the imaging plane. Preferably, the sensor support is configured to move the sensor(s) always in the same direction along a closed loop.

It should be noted that the above-described embodiments of the present invention are only examples of possible implementations. Those skilled in the art will understand from the present disclosure that many variations and modifications may be made to the embodiments described herein without departing from the scope of the present invention which is defined by the appended claims. Certain features of one embodiment could be transposed to any one of the other embodiments. For instance, piezoelectric device used for the application described in the first embodiment could well be connected to each sensor of the second embodiment to achieve the same effect, namely to prevent distortion of the captured image. In addition, while the imaging system is well-suited for control quality in a production line, or for authenticating products where visual characteristics are used for verification, it could also be used for instance for flying targets picturing or for picturing in a vibrating environment.

The invention claimed is:

1. An imaging device, the imaging device comprising:
a stationary camera lens configured to reproduce an image of at least a portion of a moving object in an imaging plane; and
at least one image sensor configured to receive the reproduced image of and convert the reproduced image into electronic signals,
wherein the at least one image sensor is mounted on a sensor support configured to be actuated to induce motion of the at least one image sensor in the imaging plane relative to the stationary camera lens,
wherein the sensor support is configured to be actuated such that the motion of the at least one image sensor is synchronized with a motion of the moving object while the moving object moves at constant speed across a capturing region during an exposure time defined for capturing the image and such that there is substantially no relative movement between the reproduced image in the imaging plane and the at least one image sensor when the moving object continuously moves across the capturing region at the constant speed.

2. The imaging device according to claim 1, wherein the at least one image sensor is an area array image sensor or a linear image sensor.

3. The imaging device according to claim 1, wherein the sensor support is actuable such that the at least one image sensor and the moving object move in opposite directions along substantially parallel rectilinear trajectories when the moving object moves across the capturing region.

4. The imaging device according to claim 1, further comprising:
conveyor means configured to bring the moving object across the capturing region,
wherein the conveyor means includes a conveyor belt configured to move relative to a supporting structure and the stationary camera lens is mounted stationary relative to the supporting structure.

5. The imaging device according to claim 1, wherein the sensor support is a belt along which a plurality of image sensors are mounted, the belt being linearly actuable in order to impart a linear movement to each image sensor when passing above the stationary camera lens while the moving object moves across the capturing region.

6. The imaging device according to claim 1, wherein the sensor support is a cylindrical support rotatable about its longitudinal axis, with the longitudinal axis being essentially perpendicular to an axis of the stationary camera lens, wherein the at least one image sensor is mounted on a circumference of the cylindrical support such that the at least one image sensor is moved in the imaging plane relative to the stationary camera lens by rotating the cylindrical support.

7. The imaging device according to claim 1, comprising:
a plurality of linear image sensors mounted on the sensor support, the plurality of linear image sensors being configured so that at least some linear image sensors of the plurality of linear image sensors capture each a part of the reproduced image when the moving object moves across the capturing region, wherein the imaging device is configured to reconstitute the image of at least the portion of the moving object from parts of the reproduced image taken by each image sensor of the at least some linear image sensors.

8. The imaging device according to claim 1, comprising:
at least one cluster of image sensors, each cluster of the at least one cluster including a separate plurality of linear image sensors mounted on the sensor support,
wherein the at least one cluster is configured so that each linear image sensor of the at least one cluster captures a part of the reproduced image when the moving object moves across the capturing region,
wherein the imaging device is configured to reconstitute the image of at least the portion of the moving object from parts of the reproduced image taken by each linear image sensor of the at least one cluster.

9. The imaging device according to claim 8, wherein,
the sensor support is a cylindrical support rotatable about its longitudinal axis, with the longitudinal axis being perpendicular to an axis of the stationary camera lens,
the image device includes a plurality of clusters, each cluster including a separate plurality of linear image sensors mounted on a circumference of the cylindrical support along a disconnected arc of circles α, and
the imaging device is configured to reconstitute the image of at least the portion of the moving object from parts of the reproduced image taken by each linear image sensor of a particular separate plurality of linear image sensors while the cylindrical support rotates about an angle corresponding to α.

10. The imaging device according to claim 1, wherein the sensor support is rotatably actuable to move the at least one image sensor in the imaging plane of the stationary camera lens as the moving object moves across the capturing region.

11. The imaging device according to claim 10, wherein the sensor support is configured to be further actuated along a linear direction opposite to a direction of the moving object when the moving object moves across the capturing region.

12. The imaging device according to claim 10, wherein the sensor support comprises one image sensor, the sensor support being adapted to rotate approximately through 360° between two captured images of two successive moving objects.

13. The imaging device according to claim 10, wherein the sensor support includes N image sensors, the sensor support configured to rotate through 360°/N between two captured images of two successive moving objects.

14. The imaging device according to claim 13, wherein the N image sensors are mounted at different heights on the sensor support, such that the N image sensors are configured to capture images at different focal lengths of the stationary camera lens.

15. The imaging device according to claim 1, further comprising:
a processing unit configured to process data relating to a position, a velocity and a distance of each moving object from the capturing region in order to adapt a speed of the sensor support to ensure that each moving object is placed in correspondence with an image sensor when each moving object moves across the capturing region.

16. The imaging device according to claim 1, further comprising:
a processing unit configured to control a rotation speed of the sensor support to accelerate or decelerate the rotation speed of the sensor support based on an external signal indicating an approaching moving object to the capturing region in order to position a corresponding image sensor above the stationary camera lens when the approaching moving object moves across the capturing region.

* * * * *